(12) United States Patent
Akkapeddi et al.

(10) Patent No.: US 11,345,809 B2
(45) Date of Patent: May 31, 2022

(54) OXYGEN SCAVENGING COMPOSITIONS REQUIRING NO INDUCTION PERIOD

(71) Applicant: GRAHAM PACKAGING COMPANY, L.P., Lancaster, PA (US)

(72) Inventors: Murali K. Akkapeddi, Norcross, GA (US); Brian A. Lynch, Merrimack, NH (US)

(73) Assignee: GRAHAM PACKAGING COMPANY, L.P., Lancaster, PA (US)

( * ) Notice: Subject to any disclaimer, the term of this patent is extended or adjusted under 35 U.S.C. 154(b) by 172 days.

(21) Appl. No.: 16/677,085

(22) Filed: Nov. 7, 2019

(65) Prior Publication Data

US 2020/0071517 A1 Mar. 5, 2020

Related U.S. Application Data

(63) Continuation of application No. 14/861,481, filed on Sep. 22, 2015, now abandoned, which is a
(Continued)

(51) Int. Cl.
  *C08L 67/02* (2006.01)
  *C08L 71/00* (2006.01)
  (Continued)

(52) U.S. Cl.
  CPC ............... *C08L 67/02* (2013.01); *C08J 5/18* (2013.01); *C08K 5/098* (2013.01); *C08K 5/103* (2013.01);
  (Continued)

(58) Field of Classification Search
  None
  See application file for complete search history.

(56) References Cited

U.S. PATENT DOCUMENTS

| | | |
|---|---|---|
| 3,028,366 A | 4/1962 | Engle, Jr. et al. |
| 4,107,149 A | 8/1978 | Bier et al. |

(Continued)

FOREIGN PATENT DOCUMENTS

| | | |
|---|---|---|
| EP | 1 911 606 | 4/2008 |
| WO | 01/14452 | 3/2001 |

(Continued)

OTHER PUBLICATIONS

Goldberg, B. and Johnson, D., "What's happening in high-barrier PET?". Packaging World. Retrieved from https://www.packworld.com on Nov. 30, 2021. (Year: 2008).*

(Continued)

*Primary Examiner* — Richard A Huhn
(74) *Attorney, Agent, or Firm* — Stradley Ronon Stevens & Young, LLP

(57) ABSTRACT

The present invention provides a composition comprising: a polyester base polymer; an oxidizable polyether-based additive; and a transition metal catalyst, wherein the polyester base polymer is substantially free of antimony. Containers made include a wall made of the composition. The polyester base polymer may preferably include polyethylene terephthalate and include less than about 100 ppm of antimony, less than about 50 ppm, less than about 10 ppm, or between about 0 and about 2 ppm. Containers made from the composition are substantially clear and exhibit excellent oxygen scavenging properties with little to no induction period.

39 Claims, 7 Drawing Sheets

Related U.S. Application Data continuation-in-part of application No. 14/535,703, filed on Nov. 7, 2014, now abandoned.

(51) Int. Cl.

| | | |
|---|---|---|
| *C08K 3/11* | (2018.01) | |
| *C08K 5/098* | (2006.01) | |
| *C08K 5/103* | (2006.01) | |
| *C08K 5/12* | (2006.01) | |
| *C08J 5/18* | (2006.01) | |
| C08G 63/82 | (2006.01) | |
| C08G 63/85 | (2006.01) | |
| C08G 63/86 | (2006.01) | |
| C08G 63/183 | (2006.01) | |
| C08G 63/127 | (2006.01) | |

(52) U.S. Cl.
CPC .............. *C08K 5/12* (2013.01); *C08G 63/127* (2013.01); *C08G 63/183* (2013.01); *C08G 63/826* (2013.01); *C08G 63/85* (2013.01); *C08G 63/86* (2013.01); *C08J 2367/02* (2013.01); *C08J 2467/02* (2013.01); *C08J 2471/02* (2013.01); *C08K 3/11* (2018.01)

(56) References Cited

U.S. PATENT DOCUMENTS

| | | |
|---|---|---|
| 4,536,409 A | 8/1985 | Farrell et al. |
| 4,824,895 A | 4/1989 | Rosenfeld |
| 5,021,515 A | 6/1991 | Cochran et al. |
| 5,049,624 A | 9/1991 | Adams et al. |
| 5,075,362 A | 12/1991 | Hofeldt et al. |
| 5,211,875 A | 5/1993 | Speer et al. |
| 5,302,430 A | 4/1994 | Ardéchir et al. |
| 5,639,815 A | 6/1997 | Cochran et al. |
| 5,955,527 A | 9/1999 | Cochran et al. |
| 5,962,625 A | 10/1999 | Yau |
| 6,083,585 A | 7/2000 | Cahill et al. |
| 6,254,803 B1 | 7/2001 | Matthews et al. |
| 6,423,776 B1 | 7/2002 | Akkapeddi et al. |
| 6,455,620 B1* | 9/2002 | Cyr .......................... C08L 71/02 524/376 |
| 6,558,762 B2 | 5/2003 | Cahill et al. |
| 7,396,865 B2 | 7/2008 | Tsuji et al. |
| 2004/0013833 A1 | 1/2004 | Lee et al. |
| 2004/0043172 A1 | 3/2004 | Schmidt et al. |
| 2004/0044118 A1 | 3/2004 | Waddell et al. |
| 2005/0261462 A1* | 11/2005 | Nichols ................. C08G 63/85 528/272 |
| 2006/0148957 A1 | 7/2006 | Stewart et al. |
| 2006/0180790 A1 | 8/2006 | Deshpande et al. |
| 2008/0075965 A1 | 3/2008 | Dershem |
| 2008/0161529 A1 | 7/2008 | Jenkins et al. |
| 2008/0277622 A1 | 11/2008 | Deshpande et al. |
| 2009/0278087 A1 | 11/2009 | Deshpande et al. |
| 2010/0154361 A1 | 6/2010 | Deshpande et al. |
| 2011/0123741 A1 | 5/2011 | Deshpande |
| 2011/0275742 A1 | 11/2011 | Akkapeddi et al. |
| 2012/0114887 A1 | 5/2012 | Drbohlav, III et al. |
| 2012/0214935 A1 | 8/2012 | Roodvoets et al. |
| 2013/0306905 A1 | 11/2013 | Akkapeddi et al. |
| 2015/0197623 A1 | 7/2015 | Akkapeddi et al. |

FOREIGN PATENT DOCUMENTS

| | | |
|---|---|---|
| WO | 2008/127542 A1 | 10/2008 |
| WO | 2010/042125 | 4/2010 |
| WO | 2012/154379 | 11/2012 |

OTHER PUBLICATIONS

Catalytic Technologies, "Nov. 2014—CTL Ti-PET bottles show improved oxygen barrier properties", Nov. 4, 2014. Retrieved from http://ctl8.com/november-2014-ctl-ti-pet-bottles-show-improved-oxygen-barrier-properties/ on Mar. 23, 2016.

Hu, Y.S. et al., "Improving Oxygen Barrier Properties of Poly(ethylene terephthalate) by Incorporating Isophthalate. II. Effect of Crystallization" Journal of Applied Polymer Science 2005, 98, 1629-1642.

Resano et al., "Direct determination of phosphorus in two different plastic materials (PET and PP) by solid sampling-graphite furnace atomic absorption spectrometry" J. Anal. At. Spectrom., 2000, 15, 1383-1388.

Thiele et al., "Quo vadis polyester catalyst?" Chemical Fibers International, vol. 54, Jun. 2004, pp. 162-163.

Weissman, Dan, "Catalysing PET" Reprinted from Plastics in Packaging, Jul. 2014, pp. 22-23.

\* cited by examiner

OXYGEN SCAVENGING COMPOSITIONS REQUIRING NO INDUCTION PERIOD

CROSS-REFERENCE TO RELATED APPLICATIONS

This application is a continuation of U.S. patent application Ser. No. 14/861,481, filed Sep. 22, 2015, which is a continuation-in-part of U.S. patent application Ser. No. 14/535,703, filed Nov. 7, 2014, now abandoned, the disclosures of which are hereby incorporated by reference in their entireties.

BACKGROUND OF THE INVENTION

The present invention relates to compositions useful for oxygen scavenging, particularly to substantially transparent compositions including a substantially antimony-free base polymer, an oxidizable polyether-based additive, and a transition metal salt as an oxidation catalyst.

All references, including publications, patent applications, and patents, cited herein are hereby incorporated by reference to the same extent as if each reference were individually and specifically indicated to be incorporated by reference and were set forth in its entirety herein.

It is well known that oxygen-sensitive food products such as tomato-based ketchups and sauces, and beverage products such as orange juice, beer, and green tea, require a packaging material that has either high oxygen barrier properties or the ability to block any oxygen ingress so as to preserve the freshness and flavor of the packaged contents. Traditionally, metal and glass packaging (e.g., cans or jars) has been used as oxygen-impervious containers.

However, in recent years, plastic containers, and more particularly injection stretch blow molded polyethylene terephthalate (PET) containers have made significant inroads into packaging, replacing the metal and glass containers for at least reasons of better economics, lighter weight, increased breakage resistance, and better consumer acceptance. Such PET containers have indeed enjoyed widespread use in packaging at least because the biaxial orientation of PET polymer chains leads to a unique combination of clarity, toughness and moderate gas barrier properties. However, there is still a need to enhance the oxygen barrier of PET containers even further in order to extend its use in the packaging of highly oxygen sensitive food and beverage products.

Use of certain polyamides in combination with a transition metal is known to be useful as an oxygen scavenging material. One particularly useful polyamide is PA-MXD6 which contains meta-xylene residues in the polymer chain. See, for example, U.S. Pat. Nos. 5,639,815; 5,049,624; and 5,021,515.

U.S. Pat. Nos. 6,083,585 and 6,558,762 to Cahill disclose oxygen scavenging polyester compositions wherein the oxygen scavenging component is polybutadiene-PET block copolymer and the catalyst for the oxygen scavenging material is transition metal salts.

U.S. Pat. No. 6,455,620 to Cyr et. al., discloses the use of polyethers selected from polyalkylene glycols, their copolymers, and blends thereof as oxygen scavengers in PET.

U S. Patent Application Publications US2012/0114887 and US2012/0214935 disclose the use of copolyetheresters as oxygen scavengers in PET.

While the oxygen scavengers found in the references above found some utility in packaging, there are still some drawbacks that include lengthy induction periods before oxygen-scavenging activity is achieved and or life spans (capacities) which may be too short. For example, molded containers that employ diamides such as, for example, dibenzyl adipamide (DBA) as oxygen scavengers may have an induction period of up to three months at ambient temperature and humidity or up to four weeks at elevated temperature (38° C.) and humidity (85% RH) after the bottles are filled with deoxygenated water. This induction period is not acceptable in real commercial practice where plastic containers are made and filled immediately (or shortly thereafter) with an oxygen-sensitive food or beverage product. The oxygen scavenging must occur immediately after filling to protect the taste and nutrient qualities of the food and/or beverage products contained within. In some instances, these deficiencies can be partially addressed by increasing the level of oxygen scavenger or the oxidation catalyst, but this invariably results in not only increased cost but also many undesirable effects such as haze, color, decreased melt viscosity, poor processability, and recyclability issues.

Thus, there is a need in the art for effective oxygen scavenging compositions that satisfy container clarity requirements and eliminate any induction period for oxygen scavenging such that prolonged aging or conditioning of formed containers is not needed.

BRIEF SUMMARY OF THE INVENTION

Embodiments of the present invention include compositions including a substantially antimony-free polyester base polymer; an oxidizable polyether-based additive; and a transition metal catalyst. The polyester base polymer is preferably polyethylene terephthalate and in one embodiment preferably contains less than 100 ppm of antimony, more preferably less than 50 ppm of antimony, even more preferably less than 10 ppm of antimony, and most preferably contains between about 0 ppm and about 2 ppm of antimony. In another embodiment, the polyester base polymer preferably includes 46 ppm or less of antimony, more preferably 40 ppm or less of antimony, even more preferably 31.4 ppm or less of antimony, and most preferably 15.7 ppm or less of antimony.

The oxidizable polyether-based additive has the general formula X—[R—O]$_n$—R'—Y, where R is a substituted or unsubstituted alkylene chain having from 2 to 10 carbon atoms; n ranges from 4 to 100; X and Y are selected from the group consisting of: H, OH, —OCOR$_1$, —OCOAr$_1$, —OR$_1$ and —OAr$_1$; and R' may be the same as R or selected from the group consisting of —[COR$_2$COOR$_3$O]$_p$— and —[COAr$_2$COOR$_3$O]$_p$—. R$_1$ is an alkyl group having from 2 to 18 carbon atoms, Ar$_1$ is an aryl group, Ar$_2$ is a phenylene or naphthylene group, R$_2$ and R$_3$ are C$_2$ to C$_{18}$ alkylene groups, and p ranges from 10 to 100. The oxidizable polyether-based additive is preferably selected from polyether diols, ester capped derivatives of polyether diols, polyether-polyester block copolymers, and ether-capped derivatives of polyetherdiols (e.g., α,ω-polyether diethers). Preferable among the polyether diols is polytetramethylene ether glycol, preferable among the ester capped derivatives of polyether diols are polytetramethylene ether glycol dibenzoate and polytetramethylene ether glycol dioctaoate, and preferable among the polyether-polyester block copolymers is PTMEG-b-PET copolymer. Preferable among the α,ω-polyether diethers are PTMEG-α,ω-dimethyl ether or PTMEG-α,ω-diethyl ether. The oxidizable polyether based additive may make up at least 0.5 wt. % of the composition, preferably about 1 wt. % to about 5 wt. %.

The transition metal catalyst preferably is a transition metal salt of cobalt. The cation of the transition metal salt is preferably a carboxylate cation. In a preferred embodiment, the transition metal salt is cobalt neodecanoate.

Another embodiment of the present invention includes a wall for a package having at least one layer. The layer is made of a composition including a substantially antimony-free polyester base polymer; an oxidizable polyether-based additive; and a transition metal catalyst. Preferred compounds for the polyester base polymer, the oxidizable polyether-based additive, and the transition metal catalyst are as described above.

DETAILED DESCRIPTION OF THE INVENTION

Figure 1:
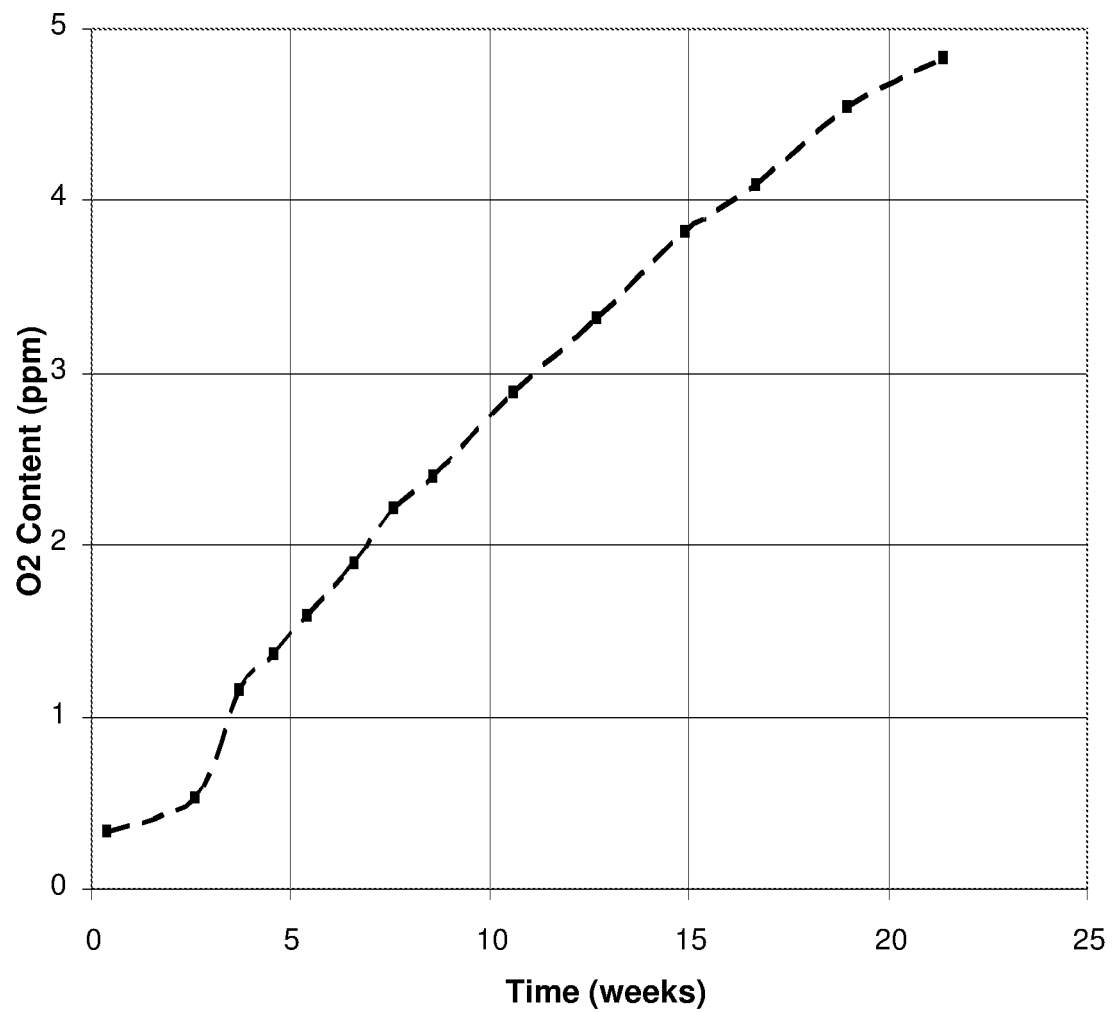
FIG. 1 is a graph depicting oxygen ingress data for a PET bottle according to Control Example 1.

Embodiments of the present invention include compositions that are useful in the manufacture of packaging for oxygen-sensitive materials. In some embodiments, the composition includes a polyester base polymer, an oxidizable polyether-based additive and a transition metal salt as an oxidation catalyst, wherein the polyester base polymer is substantially free of antimony, and wherein the composition exhibits excellent oxygen scavenging properties as well as excellent clarity (i.e., lack of haze) when blow molded, for example, from a preform into, for example, a monolayer container via an injection stretch blow molding process.

If the polyester base polymer contained unacceptably high levels of antimony, the composition would require an induction period prior to any significant oxygen scavenging. While not being bound by any specific theory, it is believed that initially the small amount of oxygen that permeates into the wall of a preform or bottle made from the composition reacts with the transition metal salt to form peroxide free radicals believed to be needed for the initiation and propagation of free radical oxidation chain reaction on the polyether additive thus triggering the oxygen scavenging in the preform or bottle. Depending on the presence of any inhibitor impurities in the PET such as antimony or phosphorous, the catalytic activity of the transition metal catalyst as well as the free radical initiation and propagation may be deactivated to a varying extent, resulting in an induction period before the onset of oxygen scavenging. Accordingly, by maintaining a sufficiently low concentration of antimony, a bottle may be formed without any significant induction period. Each of the polyester base polymer, the oxidizable polyether-based additive, and the transition metal salt will now be described in greater detail.

1) Polyester Base Polymer

In preferred embodiments, the base polymer is a polyester. Examples of suitable polyester polymers include polyethylene terephthalate homopolymers and copolymers of polyethylene terephthalate modified with one or more polycarboxylic acid modifiers and hydroxyl compound modifiers (collectively, "PET"), polyethylene naphthalate homopolymers and copolymers of polyethylene naphthalate modified with one or more polycarboxylic acid modifiers and hydroxyl compound modifiers ("PEN"), and blends of PET and PEN. A suitable PET or PEN polymer may include the one or more polycarboxylic acid modifiers in a cumulative amount of less than about 15 mole %, or less than about 10 mole %, or less than about 8 mole %. A suitable PET or PEN polymer may include the one or more hydroxyl compound modifiers in an amount of less than about 60 mole %, or less than about 50 mole %, or less than about 40 mole %, or less than about 15 mole %, or less than about 10 mole %, or less than about 8 mole %. A modifier polycarboxylic acid compound or hydroxyl compound is a compound other than the compound contained in an amount of at least about 85 mole %. The preferred polyester polymer is polyalkylene terephthalate, and most preferred is PET. In some embodiments, the polyester polymer contains at least about 90 mole % ethylene terephthalate repeat units, and in other embodiments, at least about 92 mole %, and in yet other embodiments at least about 94 mole %, based on the moles of all repeat units in the polyester polymers.

In addition to a diacid component of terephthalic acid, derivatives of terephthalic acid, naphthalene-2,6-dicarboxylic acid, derivatives of naphthalene-2,6-dicarboxylic acid, or mixtures thereof, the polycarboxylic acid component(s) of the present polyester may include one or more additional modifier polycarboxylic acids. Such additional modifier polycarboxylic acids include aromatic dicarboxylic acids preferably having about 8 to about 14 carbon atoms, aliphatic dicarboxylic acids preferably having about 4 to about 12 carbon atoms, or cycloaliphatic dicarboxylic acids preferably having about 8 to about 12 carbon atoms.

Examples of modifier dicarboxylic acids useful as an acid component(s) are phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like, with isophthalic acid, naphthalene-2,6-dicarboxylic acid, and cyclohexanedicarboxylic acid being most preferable. It should be understood that use of the corresponding acid anhydrides, esters, and acid chlorides of these acids is included in the term "polycarboxylic acid." It is also possible for trifunctional and higher order polycarboxylic acids to modify the polyester.

The hydroxyl component is made from compounds containing 2 or more hydroxyl groups capable of reacting with a carboxylic acid group. In some preferred embodiments, preferred hydroxyl compounds contain 2 or 3 hydroxyl groups. Certain preferred embodiments have 2 hydroxyl groups. These hydroxyl compounds include $C_2$-$C_4$ alkane diols, such as ethylene glycol, propane diol, and butane diol, among which ethylene glycol is most preferred for container applications. In addition to these diols, other modifier hydroxyl compound component(s) may include diols such as cycloaliphatic diols preferably having 6 to 20 carbon atoms and/or aliphatic diols preferably having about 3 to about 20 carbon atoms. Examples of such diols include diethylene glycol; triethylene glycol; 1,4-cyclohexanedimethanol; propane-1,3-diol and butane-1,4-diol (which are considered modifier diols if ethylene glycol residues are present in the polymer in an amount of at least 85 mole % based on the moles of all hydroxyl compound residues); pentane-1,5-diol; hexane-1,6-diol; 3-methylpentanediol-(2, 4); neopentyl glycol; 2-methylpentanediol-(1,4); 2,2,4-trimethylpentane-diol-(1,3); 2,5-ethylhexanediol-(1,3); 2,2-diethyl propane-diol-(1,3); hexanediol-(1,3); 1,4-di-(hydroxyethoxy)-benzene; 2,2-bis-(4-hydroxycyclohexyl)-propane; 2,4-dihydroxy-1,1,3,3-tetramethyl-cyclobutane; 2,2-bis-(3-hydroxyethoxyphenyl)-propane; and 2,2-bis-(4-hydroxypropoxyphenyl)-propane. Typically, polyesters such as polyethylene terephthalate are made by reacting a glycol with a dicarboxylic acid as the free acid or its dimethyl ester to produce an ester monomer and/or oligomers, which are then polycondensed to produce the polyester.

In some preferred embodiments, modifiers include isophthalic acid, naphthalenic dicarboxylic acid, trimellitic anhydride, pyromellitic dianhydride, 1,4-cyclohexane dimethanol, and diethylene glycol. The amount of the polyester polymer in the formulated polyester polymer composition ranges from greater than about 50.0 wt. %, or greater than about 80.0 wt. %, or greater than about 90.0 wt. %, or greater than about 95.0 wt. %, or greater than about 96.0 wt. %, or greater than about 97.0 wt. %, and up to about 99.90 wt. %, based on the combined weight of all polyester polymers and all polyamide polymers. The formulated polyester polymer compositions may also include blends of formulated polyester polymer compositions with other thermoplastic polymers such as polycarbonate. In some preferred compositions, the polyester comprises a majority of the composition of the inventions, and in some embodiments the polyester is present in an amount of at least about 80 wt. %, or at least about 90 wt. %, based on the weight of the composition (including the oxidizable polyether-based additive and a transition metal salt, but excluding fillers, inorganic compounds or particles, fibers, impact modifiers, or other polymers which serve as impact modifiers or which form a discontinuous phase such as may be found in cold storage food trays).

The polyester base polymer is substantially free of antimony. In one embodiment, the term "substantially free of antimony" refers to polyester base polymers including less than about 100 ppm of antimony, preferably less than about 50 ppm, more preferably less than about 10 ppm, and most preferably from about 0 ppm to about 2 ppm. In another embodiment, the term "substantially free of antimony" refers to polyester base polymers comprising 46 ppm or less of antimony, preferably 40 ppm or less of antimony, more preferably 31.4 ppm or less of antimony, and most preferably 15.7 ppm or less of antimony. It is also preferable that the base polymer is substantially free of phosphorus. As used herein, the term "substantially free of phosphorus" refers to polyester base polymers including less than about 20 ppm of phosphorus, preferably less than about 10 ppm, more preferably less than about 5 ppm, and most preferably the polyester base polymer includes about 0 ppm to about 1 ppm. PET polymers formed using typical antimony metal-based catalysts typically contain about 190 ppm to about 300 ppm antimony and about 20 ppm to about 100 ppm of phosphorus.

In an exemplary embodiment, the antimony-free polyester base polymer is selected from PET resins formed using titanium, germanium, or aluminum metal-based catalysts. In some embodiments, the polyester base polymer may include a blend of a low-antimony or substantially antimony-free polyester base polymer and a polyester base polymer having a greater concentration of antimony, so long as the blend has an antimony concentration below the limits described above. Examples of preferred antimony-free PET resins are selected from titanium catalyst-based PET resins such as Laser+® HS Ti 818, W Ti 844 and the aluminum catalyst-based PET resins such as Laser+® B92A (formerly Parastar 7000) available from DAK America. The polyester base polymer may preferably have an intrisic viscosity (IV) ranging from about 0.5 dl/g to about 1.0 dl/g, more preferably from about 0.65 dl/g to about 0.9 dl/g and most preferably from about 0.72 dl/g to about 0.84 dl/g.

Other base polymers may be used with the instant invention provided that the other base polymer also has a sufficiently low level of antimony. One example is polypropylene. In certain embodiments, the polyester polymers of the invention are thermoplastic and, thus, the form of the compositions are not limited and can include a composition in the melt phase polymerization, as an amorphous pellet, as a solid stated polymer, as a semi-crystalline particle, as a composition of matter in a melt processing zone, as a bottle preform, or in the form of a stretch blow molded bottle or other articles.

2) Oxidizable Polyether-Based Additive

In preferred embodiments, the oxidizable polyether-based additive includes the general structure of:

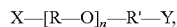

wherein R is a substituted or unsubstituted alkylene chain having from 2 to 10 carbon atoms (such as ethylene, propylene, butylene, 1,4-tetramethylene, etc.);

n ranges from 4 to 100;

X and Y are selected from H, OH, —OCOR$_1$ groups, —OCOAr$_1$, —OR$_1$, and —OAr$_1$ groups, where R$_1$ is an alkyl group (such as methyl, ethyl, propyl and so on up to C18) and Ar is an aryl group (such as an unsubstituted or substituted phenyl, naphthyl, etc.); and R' may be the same as R or selected from the group consisting of —[COR$_2$COOR$_3$O]$_p$— and —[COAr$_2$COOR$_3$O]$_p$—, wherein Ar$_2$ is a phenylene or naphthylene group, R$_2$ and R$_3$ are C$_2$ to C$_{18}$ alkylene groups, and p ranges from 10 to 100.

As used herein, the term "alkyl" refers to a substituted or unsubstituted aliphatic hydrocarbon chain. Alkyl groups have straight and branched chains. In some embodiments, alkyls have from 1 to 12 carbon atoms or 1 to 6 carbon atoms, unless explicitly specified otherwise. Alkyl groups include, but are not limited to methyl, ethyl, propyl, isopropyl, butyl, 1-butyl and t-butyl. Specifically included within the definition of "alkyl" are those aliphatic hydrocarbon chains that are optionally substituted.

As used herein, the term "aryl" is defined herein as an aromatic carbocyclic moiety of up to 20 carbon atoms. In some embodiments, aryl groups have 6-20 carbon atoms or 6-14 carbon atoms. Aryls may be a single ring (monocyclic) or multiple rings (bicyclic, up to three rings) fused together or linked covalently. Any suitable ring position of the aryl moiety may be covalently linked to the defined chemical structure. Aryl groups include, but are not limited to, phenyl, 1-naphthyl, 2-naphthyl, dihydronaphthyl, tetrahydronaphthyl, biphenyl, anthryl, phenanthryl, fluorenyl, indanyl, biphenylenyl, acenaphthenyl, and acenaphthylenyl. In some embodiments, phenyl is a preferred aryl. Aryl groups may also be optionally substituted with one or more substituents.

Optional substituents for alkyl, alkenyl, or aryl groups are well known to those skilled in the art. These substituents include alkyl, alkoxy, aryloxy, hydroxy, acetyl, cyano, nitro, glyceryl, and carbohydrate, or two substituents taken together may be linked as an alkylene group to form a ring.

The preferred polyether based additives are selected from:
(1) polyether diols (also known as polyols) such as polyethylene glycol, polypropylene glycol, polytetramethylene ether glycol (PTMEG), of which PTMEG is preferred;
(2) ester end-capped derivatives of polyether diols (i.e., ∝,ω-polyether diesters), of which PTMEG diesters are preferred, and PTMEG dibenzoate or dioctaoate are most preferred;
(3) polyether-polyester block copolymers such as PTMEG-b-PET, PTMEG-b-PBT copolymers, of which PTMEG-b-PET copolymer in which the PTMG content is at least 40 wt. % is preferred; and
(4) ether end-capped derivatives of polyetherdiols (e.g., μ,w-polyether diethers) of which PTMEG diethers are preferred, and PTMEG-μ,w-dimethyl ether or PTMEG-μ,w-diethyl ether are the most preferred.

In an embodiment where a PET container such as a bottle is made from the composition, the polyether-based additive may include up to about 5 wt. % of the bottle, preferably at least 0.5 wt. %. For example, an exemplary bottle may include about 1 wt. % of the polyether-based additive. If the bottle is a monolayer bottle having a single wall made of the composition, the composition may include up to about 2 wt. % of the polyether-based additive, preferably at least about 0.5 wt. %. For example, an exemplary monolayer bottle may include about 1 wt. % of the polyether-based additive. In another example, if the bottle is a multilayer bottle having a single layer comprising the composition, the layer made of the composition may include at least 0.5 wt. %, and typically about 1 wt. % to about 5 wt. % (depending on the thickness of the layer), of the at least one oxidizable polyether-based additive, so that the polyether-based additive makes up at least 0.5 wt. % of the total weight of all the layers of the bottle.

3) Transition Metal Salt

The instant compositions include as an oxidation catalyst a transition metal salt including a metal in a positive oxidation state. It should be noted that it is contemplated that one or more such metals may be used. The transition metal functions to catalyze or promote the oxidation of the organic oxidizable component (i.e., the reaction of the oxidizable polyether-based additive with molecular oxygen).

The transition metal can be selected from the first, second, or third transition series of the Periodic Table. The metal can be Rh, Ru, or one of the elements in the series of Sc to Zn (i.e., Sc, V, Cr, Mn, Fe, Co, Ni, Cu, and Zn). In some embodiments, cobalt is added in +2 or +3 oxidation state. In some embodiments, it is preferred to use cobalt in the +2 oxidation state. In certain embodiments, copper in the +2 oxidation state is utilized. In some embodiments, rhodium in the +2 oxidation state is used. In certain embodiments, zinc may also be added to the composition. Preferred zinc compounds include those in a positive oxidation state.

Suitable counter-ions to the transition metal cations include carboxylates, such as neodecanoates, octanoates, acetates, lactates, naphthalates, malates, stearates, acetylacetonates, linoleates, oleates, palmitates, 2-ethylhexanoates, or ethylene glycolates; or as their oxides, borates, carbonates, chlorides, dioxides, hydroxides, nitrates, phosphates, sulfates, or silicates among others.

In a preferred embodiment, the transition metal catalyst is selected from any cobalt carboxylate salt, preferably cobalt salts of $C_2$ to $C_{18}$ carboxylic acids. Most preferably, the transition metal catalyst is a pastille-form cobalt neodecanoate composed of a mixture of cobalt propionate and cobalt neodecanoate.

In some embodiments, the composition has a transitional metal concentration of about 20 ppm to about 400 ppm, preferably about 30 ppm to about 200 ppm, and most preferably about 50 ppm to about 100 ppm. The exact amount of transition metal used in an application can be determined by trials that are well within the skill level of one skilled in the art.

The transition metal or metals may be added neat or in a carrier (such as a liquid or wax) to an extruder or other device for making the article, or the metal may be present in a concentrate or carrier with the oxidizable organic component, in a concentrate or carrier with a base polymer, or in a concentrate or carrier with a blend of the base polymer and oxidizable polyether-based additive. Alternatively, at least a portion of the transition metal may be added as a polymerization catalyst to the melt phase reaction for making the base polymer (a polyester polymer in some embodiments) and be present as residual metals when the polymer is fed to the melting zone (e.g. the extrusion or injection molding zone) for making the article such as a preform or sheet. It is desirable that the addition of the transition metal does not substantially increase the IV of the melt in the melt processing zone. Thus, transition metal or metals may be added in two or more stages, such as once during the melt phase for the production of the polyester polymer and again once more to the melting zone for making the article.

The amounts of the components used in the oxygen scavenging formulations of the present invention can affect the use and effectiveness of this composition. Thus, the amounts of polyester base polymer, oxidizable polyether-based additive, and transition metal salt can vary depending on the desired article and its end use. For example, a primary function of the organic oxidizable components detailed above is to react irreversibly with oxygen during the scavenging process, while a primary function of the transition metal catalyst is to facilitate this process. Thus, to a large extent, the amount of the organic oxidizable component present affects the oxygen scavenging capacity of the composition, i.e., the amount of oxygen that the composition can consume, while the amount of transition metal catalyst affects the rate at which oxygen is consumed as well as the induction period.

The oxygen scavenger composition of the present invention can be incorporated in packaging articles having various forms. Suitable articles include, but are not limited to, flexible sheet films, flexible bags, pouches, semi-rigid and rigid containers such as bottles (e.g., PET bottles) or metal cans, or combinations thereof.

Typical flexible films and bags include those used to package various food items and may be made up of one or a multiplicity of layers to form the overall film or bag-like packaging material. The oxygen scavenger composition of the present invention can be used in one, some or all of the layers of such packaging material.

Typical rigid or semi-rigid articles include plastic, paper or cardboard containers, such as those utilized for juices, soft drinks, as well as thermoformed trays or cups normally having a thickness in the range of from about 100 micrometers to about 1000 micrometers. The walls of such articles can comprise single or multiple layers of materials. The articles can also take the form of a bottle or metal can, or a crown, cap, crown or cap liner, plastisol or gasket. The oxygen scavenger composition of the present invention can be used as an integral layer or portion of, or as an external or internal coating or liner of, the formed semi-rigid or rigid packaging article. As a liner, the oxygen scavenger composition can be extruded as a film along with the rigid article itself, in, e.g., a coextrusion, extrusion coating, or extrusion lamination process, so as to form the liner in situ during article production; or alternatively can be adhered by heat and/or pressure, by adhesive, or by any other suitable method to an outer surface of the article after the article has been produced.

In one preferred embodiment of the present invention, the composition of the present invention, i.e., a substantially antimony-free polyester base polymer, a transition metal in a positive oxidation state, and at least one oxidizable polyether-based additive as described above can be employed to form a monolayer bottle. In another preferred embodiment of the present invention, the composition of the present invention can form one layer of a multilayer bottle.

Besides articles applicable for packaging food and beverage, articles for packaging other oxygen-sensitive products can also benefit from the present invention. Such products would include pharmaceuticals, oxygen sensitive medical products, corrodible metals or products, electronic devices and the like.

The composition may also include other components such as pigments, fillers, crystallization aids, impact modifiers, surface lubricants, denesting agents, stabilizers, ultraviolet light absorbing agents, metal deactivators, nucleating agents such as polyethylene and polypropylene, phosphite stabilizers and dyestuffs. Other additional components are well known to those skilled in the art and can be added to the existing composition so long as they do not negatively impact the performance of the compositions. Typically, the total quantity of such components will be less than about 10% by weight relative to the total composition. In some embodiments, the amount of these optional components is less than about 5%, by weight relative to the total composition.

A common additive used in the manufacture of polyester polymer compositions used to make stretch blow molded bottles is a reheat additive because the preforms made from the composition must be reheated prior to entering the mold for stretch blowing into a bottle. Any of the conventional reheat additives can be used, such additives include various forms of black particles, e.g. carbon black, activated carbon, black iron oxide, glassy carbon, and silicon carbide; and other reheat additives such as silicas, red iron oxide, and so forth.

In many applications, not only are the packaging contents sensitive to the ingress of oxygen, but the contents may also be affected by UV light. Fruit juices and pharmaceuticals are two examples of such contents. Accordingly, in some embodiments, it is desirable to incorporate into the polyester composition any one of the known UV-absorbing compounds in amounts effective to protect the packaged contents.

The instant compositions can be made by mixing a substantially antimony-free polyester base polymer (PET, for example) with the oxidizable polyether-based additive and the transition metal catalyst. Such compositions can be made by any method known to those skilled in the art. In certain embodiments, some or part of the transition metal of the transition metal catalyst may exist in the base polymer prior to mixing. This residual metal, for example, can exist from the manufacturing process of the base polymer. In some embodiments, the substantially antimony-free polyester base polymer, the oxidizable polyether-based additive and the transition metal catalyst are mixed by tumbling in a hopper. Other optional ingredients can be added during this mixing process or added to the mixture after the aforementioned mixing or to an individual component prior to the aforementioned mixing step.

The instant composition can also be made by adding each ingredient separately and mixing the ingredients prior melt processing the composition to form an article. In some embodiments, the mixing can be just prior to the melt process zone. In other embodiments, one or more ingredients can be premixed in a separate step prior to bringing all of the ingredients together.

In some embodiments, the invention concerns use of the compositions described herein as a component of a wall that is used in a package for oxygen sensitive materials. The necessary scavenging capacity of a package will generally have to be greater for walls that have a greater permeance in the absence of scavenging additives. Accordingly, a good effect is harder to achieve when inherently higher permeance materials are used.

The wall may be a rigid one, a flexible sheet, or a clinging film. It may be homogenous or a laminate or coated with other polymers. If it is laminated or coated, then the scavenging property may reside in a layer of the wall the permeance of which is relatively high in the absence of scavenging and which alone would not perform very satisfactorily but which performs satisfactorily in combination with one or more other layers which have a relatively low permeance but negligible or insufficient oxygen-scavenging properties. A single such layer could be used on the outside of the package since this is the side from which oxygen primarily comes when the package is filled and sealed. However, such a layer to either side of the scavenging layer would reduce consumption of scavenging capacity prior to filling and sealing.

When the instant compositions are used in a wall or as a layer of a wall, the permeability of the composition for oxygen is advantageously not more than about 3.0, or not more than about 1.7, or not more than about 0.7, or not more than about 0.2, or not more than about 0.03 $cm^3$ mm/($m^2$ atm day). The permeability of the composition provided by the present invention is advantageously not more than about three-quarters of that in the absence of oxygen-scavenging properties. In some embodiments, the permeability is not more than about one half, one-tenth in certain embodiments, one twenty-fifth in other embodiments, and not more than one-hundredth in yet other embodiments of that in the absence of oxygen-scavenging properties. The permeability in the absence of oxygen-scavenging properties is advantageously not more than about 17, or not more than about 10, or not more than about 6 $cm^3$ mm/($m^2$ atm day). A particularly good effect can be achieved for such permeabilities in the range from about 0.5, or about 1.0, to 10, or about 6.0, $cm^3$ mm/($m^2$ atm day). Measuring oxygen permeation can be performed by one of ordinary skill in the art employing oxygen permeation (OTR) instrumentation such as, for example, OX-TRAN® instruments available from MOCON, Inc. (Minneapolis, Minn.).

The above-described permeabilities are achieved without an induction period, which, in practical terms means that such permeabilities are achievable immediately after the container is formed.

In another aspect, the instant composition can be used as a master batch for blending with a polymer or a polymer containing component. In such compositions, the concentration of the oxidizable polyether-based additive and the transition metal catalyst will be higher to allow for the final blended product to have suitable amounts of these components. The master batch may also contain an amount of the polymer to which the master batch is to be blended with. In other embodiments, the master batch may contain a polymer that is compatible with the polymer to which the master batch is to be blended.

In yet another aspect, the compositions of the instant invention can be used for forming a layer of a wall which primarily provides oxygen-scavenging (another layer including polymer providing gas barrier without significant scavenging), or as a head-space scavenger (completely enclosed, together with the package contents, by a package wall). Such techniques are well known to those skilled in the art.

The time period for which the permeability is maintained can be extended by storing the articles in sealed containers or under an inert atmosphere such as nitrogen prior to use with oxygen sensitive materials.

In another aspect, the invention provides a package, whether rigid, semi-rigid, collapsible, lidded, or flexible or a combination of these, comprising a wall as formed from the compositions described herein. Such packages can be formed by methods well known to those skilled in the art.

Among the techniques that may be used to make articles are molding generally, injection molding, stretch blow molding, extrusion, thermoforming, extrusion blow molding, and (specifically for multilayer structures) co-extrusion and lamination using adhesive tie layers. Orientation, e.g., by stretch blow molding, of the polymer is especially attractive with phthalate polyesters because of the known mechanical advantages that result.

The melt processing zone for making the article can be operated under customary conditions effective for making the intended articles, such as preforms, bottles, trays, and other articles mentioned below. In one embodiment, such conditions are effective to process the melt without substantially increasing the IV of the melt and which are ineffective to promote transesterification reactions. In some preferred embodiments, suitable operating conditions effective to establish a physical blend of the substantially antimony-free polyester polymer, oxidizable polyether-based additive, and transition metal catalyst are temperatures in the melt processing zone within a range of about 250° C. to about 300° C. at a total cycle time of less than about 6 minutes, and typically without the application of vacuum and under a positive pressure ranging from about 0 psig to about 900 psig. In some embodiments, the residence time of the melt on the screw can range from about 1 to about 4 minutes.

Specific articles include preforms, containers and films for packaging of food, beverages, cosmetics, pharmaceuticals, and personal care products where a high oxygen barrier is needed. Examples of beverage containers are bottles for holding water and carbonated soft drinks, and the invention is particularly useful in bottle applications containing juices, sport drinks, beer or any other beverage where oxygen detrimentally affects the flavor, fragrance, performance (prevent vitamin degradation), or color of the drink. The compositions of the instant invention are also particularly useful as a sheet for thermoforming into rigid packages and films for flexible structures. Rigid packages include food trays and lids. Examples of food tray applications include dual ovenable food trays, or cold storage food trays, both in the base container and in the lidding (whether a thermoformed lid or a film), where the freshness of the food contents can decay with the ingress of oxygen. The compositions of the instant invention also find use in the manufacture of cosmetic containers and containers for pharmaceuticals or medical devices.

The package walls of the instant invention can be a single layer or a multilayer construction. In some embodiments using multilayer walls, the outer and inner layers may be structural layers with one or more protective layers containing the oxygen scavenging material positioned there between. In some embodiments, the outer and inner layers comprise a polyolefin or a polyester. In certain embodiments, a single layer design is preferred. Such a layer may have advantages in simplicity of manufacture and cost.

In this specification and in the claims that follow, reference will be made to a number of terms, which shall be defined to have the following meanings.

As used herein, the phrase "having the formula" or "having the structure" is not intended to be limiting and is used in the same way that the term "comprising" is commonly used. The term "independently selected from" is used herein to indicate that the recited elements, e.g., R groups or the like, can be identical or different.

As used herein, the terms "a", "an", "the" and the like refer to both the singular and plural unless the context clearly indicates otherwise. "A bottle", for example, refers to a single bottle or more than one bottle.

Also as used herein, the description of one or more method steps does not preclude the presence of additional method steps before or after the combined recited steps. Additional steps may also be intervening steps to those described. In addition, it is understood that the lettering of process steps or ingredients is a convenient means for identifying discrete activities or ingredients and the recited lettering can be arranged in any sequence.

Where a range of numbers is presented in the application, it is understood that the range includes all integers and fractions thereof between the stated range limits. A range of numbers expressly includes numbers less than the stated endpoints and those in-between the stated range. A range of from 1-3, for example, includes the integers one, two, and three as well as any fractions that reside between these integers.

As used herein, "master batch" refers to a mixture of base polymer, oxidizable organic component, and transition metal that will be diluted, typically with at least additional base polymer, prior to forming an article. As such, the concentrations of oxidizable organic component and transition metal are higher than in the formed article.

The following examples are included to demonstrate preferred embodiments of the invention regarding the usefulness of low-antimony PET base resin blended with an oxidizable polyether-based additive and a transition metal salt catalyst to make oxygen scavenging, clear PET containers which exhibit no induction period. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLES

In the following examples, various compositions of PET resins, oxidizable polyether-based additives, and/or transition metal catalysts were fabricated into monolayer containers by melt blending each composition and injection molding the blended composition into preforms, followed by reheat stretch blow molding the preforms into shaped containers. The monolayer preforms were made on a single cavity, 2003 Battenfeld A800/200H/125HC injection molding machine. The blended composition was fed into the throat of the injection molding extruder heated to 260-270° C. The molten blend was then injection molded into a single cavity preform mold, such as a 30 g, 33 mm finish 20 oz. ketchup bottle preform, to form the monolayer bottle preform. The cycle time for molding was about 30 seconds. The preforms were then reheat-stretch-blow molded into monolayer bottles. The bottles were generally stretch blown on a Sidel SBO-1 machine set to run at a rate of about 800 bottles per hour. In this process, the preforms were typically heated to a surface temperature of 99° C. prior to the blowing operation. The blow mold temperature was about 12° C. The blow pressures were about 33 bar. Clear monolayer PET blend bottles were thus obtained.

The oxygen scavenging properties of the PET bottles from all of the examples were evaluated using an Oxysense 4000B instrument with OxyDot oxygen sensors (available from OxySense Inc. Dallas, Tex. 752543, USA), for the measurement of oxygen ingress/oxygen content with time. Typically the OxyDots were attached to the inside middle portion of each test bottle. Each bottle was then loaded on an orbisphere bench top filler and after an initial flushing with nitrogen, it was filled with deoxygenated water ($O_2$ content<100 ppb) and capped. After several bottles of each composition had been filled and sealed, they were stored under ambient conditions for a required shelf-life test period while the oxygen content or ingress in the bottles was measured. To make the measurements, the fiber optic pen of the instrument was aligned with the OxyDot (from the outside of the bottle), making sure that the tip of the pen was making contact with the bottle. Then the capture button was pressed to obtain the oxygen concentration in the bottle. The oxygen concentration was measured periodically with time.

Of the included examples, Control Examples 1-2 include compositions without any polyether-based additives or transition metal catalysts (i.e., no oxygen scavenging components). Comparative Examples 1-5 include compositions with polyether-based additives or transition metal catalysts but with PET base polymers having high concentrations of antimony. Examples 1-6 include compositions according to embodiments of the present invention including substantially antimony-free PET base polymers, at least one polyether-based additive, and at least one transition metal salt catalyst. Throughout the examples, reference is made to the FIGS. 1-7, which compare the various examples. Examples 7-13 include compositions according to embodiments of the present disclosure including PET base including PET base polymers having varying low levels of antimony formed by blending various regrinds of other antimony-based PETs with PET that is substantially free of antimony. The following table outlines the composition of the bottles according to each Example, described in more detail below. For each of the PET Resins listed in the table, the indicated antimony levels were measured by inductively coupled plasma optical emission spectrometry (ICP-OES) at Robertson Microlit Laboratories, Ledgewood, N.J.07852, USA.

| Example | PET Resin | Oxygen Scavenger | Transition Metal Catalyst |
| --- | --- | --- | --- |
| Control 1 | PET-1 | None | None |
| Control 2 | PET-2 | None | None |
| Comparative 1 | PET-3 | polyether additive-A | cobalt neodecanoate |
| Comparative 2 | PET-4 | polyether additive-A | cobalt neodecanoate |
| Comparative 3 | PET-1 | polyether additive-A | cobalt neodecanoate |
| Comparative 4 | PET-3 | polyether additive-B | cobalt neodecanoate |
| Comparative 5 | PET-1 | polyether additive-B | cobalt neodecanoate |
| 1 | PET-2 | polyether additive-A | cobalt neodecanoate |
| 2 | PET-5 | polyether additive-A | cobalt neodecanoate |
| 3 | PET-2 | polyether additive-A | cobalt neodecanoate |
| 4 | PET-2 | polyether additive-A | cobalt neodecanoate |
| 5 | PET-6 | polyether additive-A | cobalt neodecanoate |
| 6 | PET-2 | polyether additive-B | cobalt neodecanoate |
| 7 | PET-2 | polyether additive-A | cobalt neodecanoate |
| 8 | 95% PET-2 + 5% PET-7 | polyether additive-A | cobalt neodecanoate |
| 9 | 90% PET-2 + 10% PET-7 | polyether additive-A | cobalt neodecanoate |
| 10 | 80% PET-2 + 20% PET-7 | polyether additive-A | cobalt neodecanoate |
| 11 | 80% PET-2 + 20% PET-4 | polyether additive-A | cobalt neodecanoate |
| 12 | 80% PET-2 + 20% PET-8 | polyether additive-A | cobalt neodecanoate |
| 13 | 80% PET-2 + 20% PET-9 | polyether additive-A | cobalt neodecanoate |

PET-1: Laser+ L40A, DAK America, 248 ppm antimony
PET-2: Laser+ HS Ti818, DAK America, 0 ppm antimony
PET-3: CLEARTUF® TURBO II, M&G Corp., 317 ppm antimony
PET-4: Laser+ D53A, DAK America, 227 ppm antimony
PET-5: Laser+® 7000 (B92A), DAK America, 0 ppm antimony
PET-6: Laser+ W Ti844, DAK America, 0 ppm antimony
PET-7: NanYa AA52, Nan Ya Plastics Corp. America, 314 ppm antimony
PET-8: 8006, M&G Corp., 302 ppm antimony
PET-9: Polyclear 2201, Indorama/Auriga Polymers Inc., 201 ppm antimony
Polyether additive-A: poly(tetramethylene ether)-b-PET block copolymer (PTMEG-b-PET) (Oxyclear® 3500, Indorama)
Polyether additive-B: poly(tetramethylene ether) glycol (PTMEG) (Polymeg® 2000, Invista)

Control Example 1

In Control Example 1, a neat PET control bottle containing no oxygen scavenging additives (i.e., no oxidizable polyether-based additive or transitional metal catalyst) was made from a standard commercial type antimony catalyst-based PET resin (Laser+L40A, DAK America). This PET resin (hereinafter referred to as "PET-1") contained about 248 ppm of elemental antimony and 13 ppm of phosphorus as a catalyst residue and had an IV of 0.75 dl/g.

Monolayer, 20 oz. ketchup bottles (512 ml volume, average thickness=0.04 cm) were prepared from the PET-1 resin as control using the standard 2-step injection stretch blow molding process described above. The measurement of oxygen ingress into these bottles (after filling with deoxygenated water and sealing) was made using the OxySense method described above.

The oxygen ingress data is shown in FIG. 1. It may be noted that due to the absence of oxygen scavenger additives, this PET-1 control bottle exhibited a high level of oxygen ingress with time (about 5 ppm of $O_2$ in 20 weeks of storage time).

Control Example 2

In Control Example 2, a neat PET control bottle containing no oxygen scavenging additives ((i.e., no oxidizable polyether-based additive or transitional metal catalyst) was made by using an antimony-free, titanium catalyst-based PET resin (Laser+HS Ti818, DAK America). This PET resin (hereinafter referred to as "PET-2") had an IV of 0.79 dl/g and 0 ppm of Sb.

Monolayer, 14 oz. ketchup bottles (358 ml volume, average thickness=0.058 cm) were prepared from the PET-2 resin as control, using the standard 2-step injection stretch blow molding process described above. The measurement of oxygen ingress into these bottles (after filling with deoxygenated water and sealing) was made using the OxySense method described above.

Figure 4:
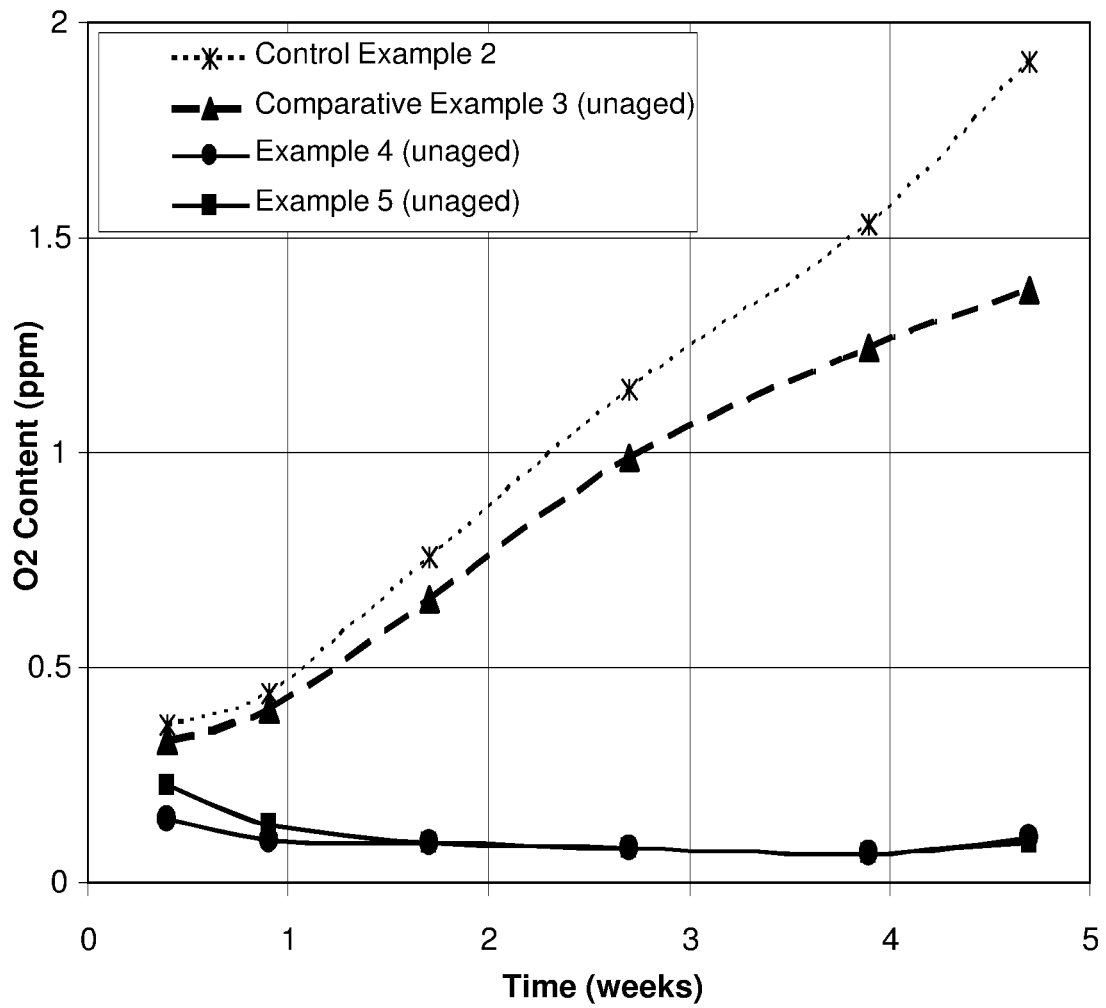
FIG. 4 is a graph depicting oxygen ingress data for a PET bottle according to Control Example 2 and unaged PET bottles according to Comparative Example 3, Example 4, and Example 5.

The oxygen ingress data in this PET-2 control bottle is shown in FIG. 4. It may be noted that due to the absence of the oxygen scavenging additive, this PET-2 control bottle had a high level of oxygen ingress into the bottle (about 2 ppm of $O_2$ in 5 weeks of storage time).

Comparative Example 1

In Comparative Example 1 a PET bottle was made from another standard commercial grade of antimony catalyst-based PET resin (CLEARTUF® TURBO II, from M&G Corp.) (hereinafter referred to as "PET-3") mixed with a oxidizable polyether-based additive, poly(tetramethylene ether)-b-PET block copolymer (PTMEG-b-PET) (Oxyclear® 3500, Indorama), (hereinafter referred to as "Polyether additive-A."). The PET-3 resin had an IV of 0.74 dl/g, an elemental antimony content of about 317 ppm, and an elemental phosphorus content of 13 ppm.

A blend of the PET-3 resin and 1 wt. % polyether additive-A and 0.035 wt. % cobalt neodecanoate was fabricated into monolayer 20 oz. ketchup bottles (512 ml volume, average thickness=0.04 cm), using the 2 step process described above. The oxygen ingress into these bottles was measured using the OxySense method described earlier.

Figure 2:
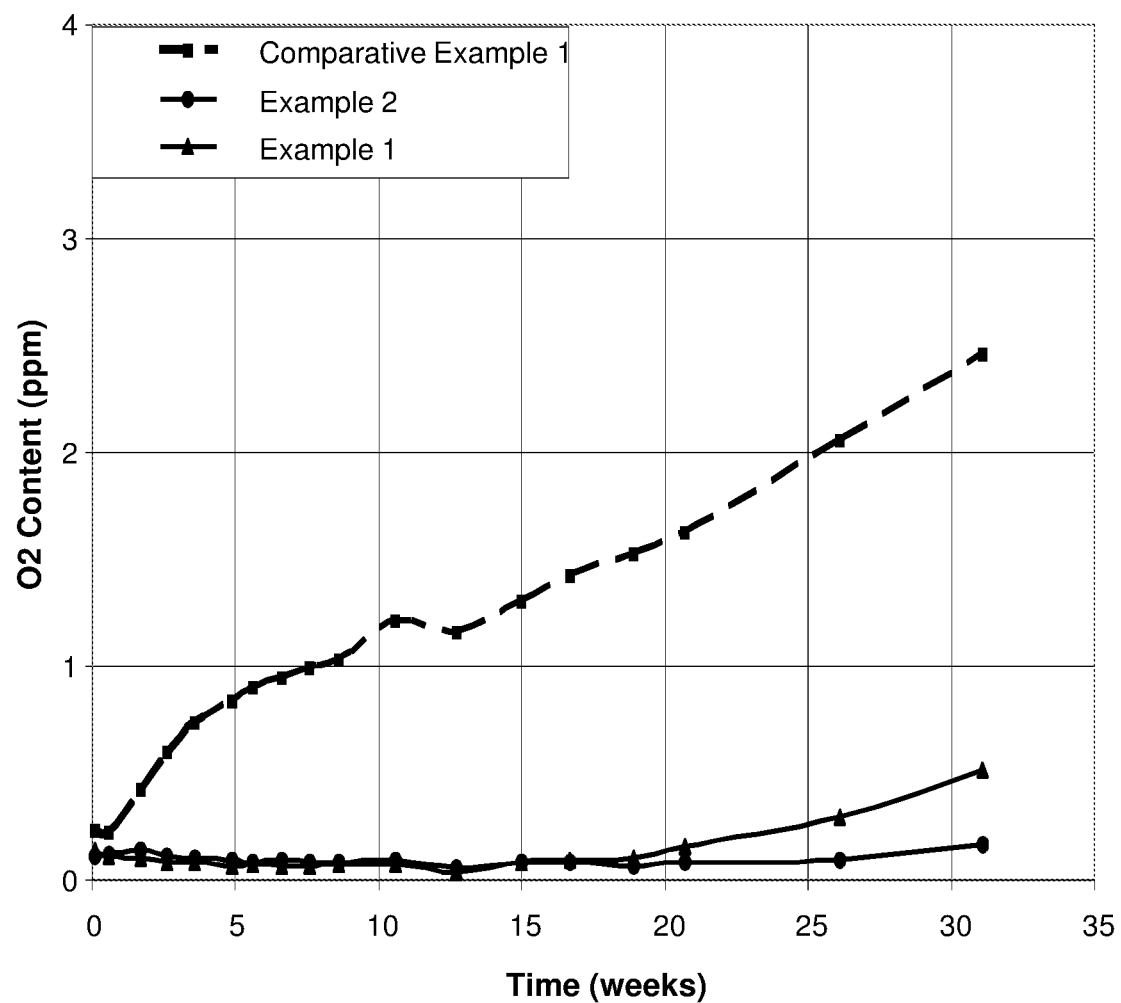
FIG. 2 is a graph depicting oxygen ingress data for PET bottles according to Comparative Example 1 and Examples 1 and 2.

The oxygen ingress data for this example is shown in FIG. 2. It may be noted that due to the presence of >300 ppm of antimony and >10 ppm of phosphorous as potential inhibiting impurities in the PET-3 base resin, in spite of the presence of the polyether additive-A as an oxygen scavenger, the bottles exhibited an induction period for oxygen scavenging showing high oxygen ingress of about 1 ppm of $O_2$ in the initial 5 weeks and >2 ppm in 30 weeks of storage time.

Comparative Example 2

In Comparative Example 2, a PET bottle was made from another standard commercial grade of antimony catalyst-based PET resin (Laser+D53A, DAK America) (hereinafter referred to as "PET-4") mixed with the polyether additive-A. The PET-4 resin had an IV of 0.74 dl/g and an elemental Sb content of 227 ppm and a phosphorous content of about 40 ppm.

A blend of 'PET-4' resin and 1.25 wt. % 'polyether additive-A' and 0.035 wt. % of cobalt neodecanoate was used to make monolayer 10 oz. juice bottles (306 ml volume; average wall thickness=0.04 cm), using the 2 step injection stretch blow molding process described earlier. The measurement of oxygen ingress into these bottles (after filling with deoxygenated water and sealing) was made using the OxySense method described earlier.

Figure 3:
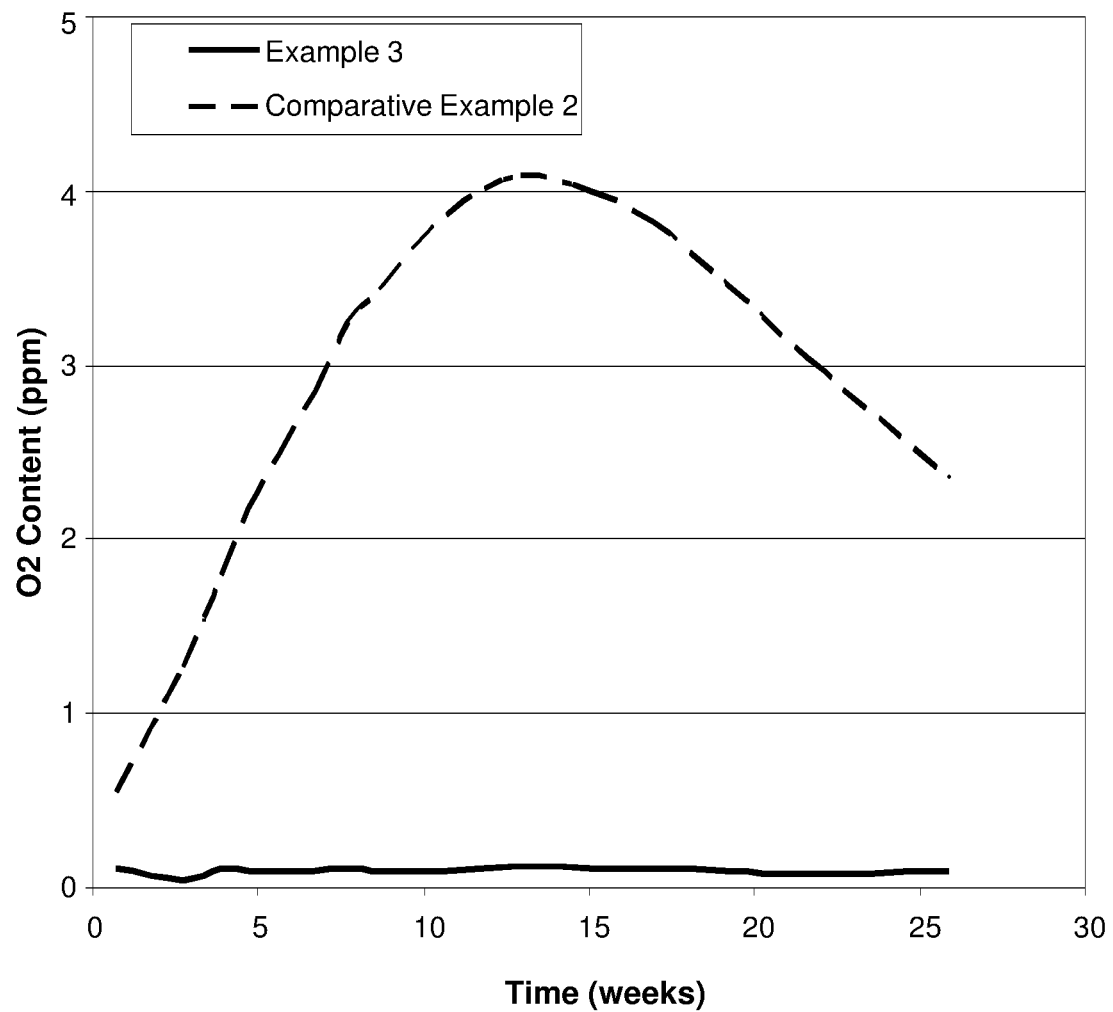
FIG. 3 is a graph depicting oxygen ingress data for PET bottles according to Comparative Example 2 and Example 3.

The oxygen ingress data for this example is shown in FIG. 3. It may be noted that due to the presence of >200 ppm of antimony and 40 ppm of phosphorous as potential inhibiting impurities in the PET-4 base resin, in spite of the presence of the polyether additive-A, the bottle exhibited an induction period for oxygen scavenging showing high oxygen ingress of up to 4 ppm of oxygen in the initial 12 weeks of storage time. After this induction period, the oxygen scavenging appears to have finally triggered and the oxygen content/ingress decreased. However, for the packaging of oxygen sensitive food and beverage products such an induction period with high initial oxygen ingress is unacceptable.

Comparative Example 3

In Comparative Example 3, PET bottles were made from a blend of the PET-1 resin and the polyether additive-A.

A blend of the PET-1 resin, 1 wt. % polyether additive-A and 0.035 wt. % Cobalt neodecanoate was injection stretch blow molded into monolayer 14 oz. ketchup bottles (358 ml volume; average wall thickness=0.058 cm), using the 2 step process described earlier. A first bottle was formed from the freshly molded preform (no aging) and a second bottle was formed from a preform aged for two weeks in ambient air and humidity in order to compare the effects of preform aging on the bottle oxygen scavenging performance. The measurement of oxygen ingress into these bottles was done immediately after filling with deoxygenated water and sealing, using the OxySense method described earlier.

The oxygen ingress data on the bottles made from freshly molded preforms is shown in FIG. 4. It may be noted that due to the presence of >200 ppm of antimony in PET-1 resin, in spite of the presence of the oxidizable 'polyether additive-A', the bottle exhibited an induction period for oxygen scavenging and hence showed a high oxygen ingress of >1 ppm of oxygen in just 3 weeks of storage time. The oxygen content/ingress continued to increase thereafter.

Figure 5:
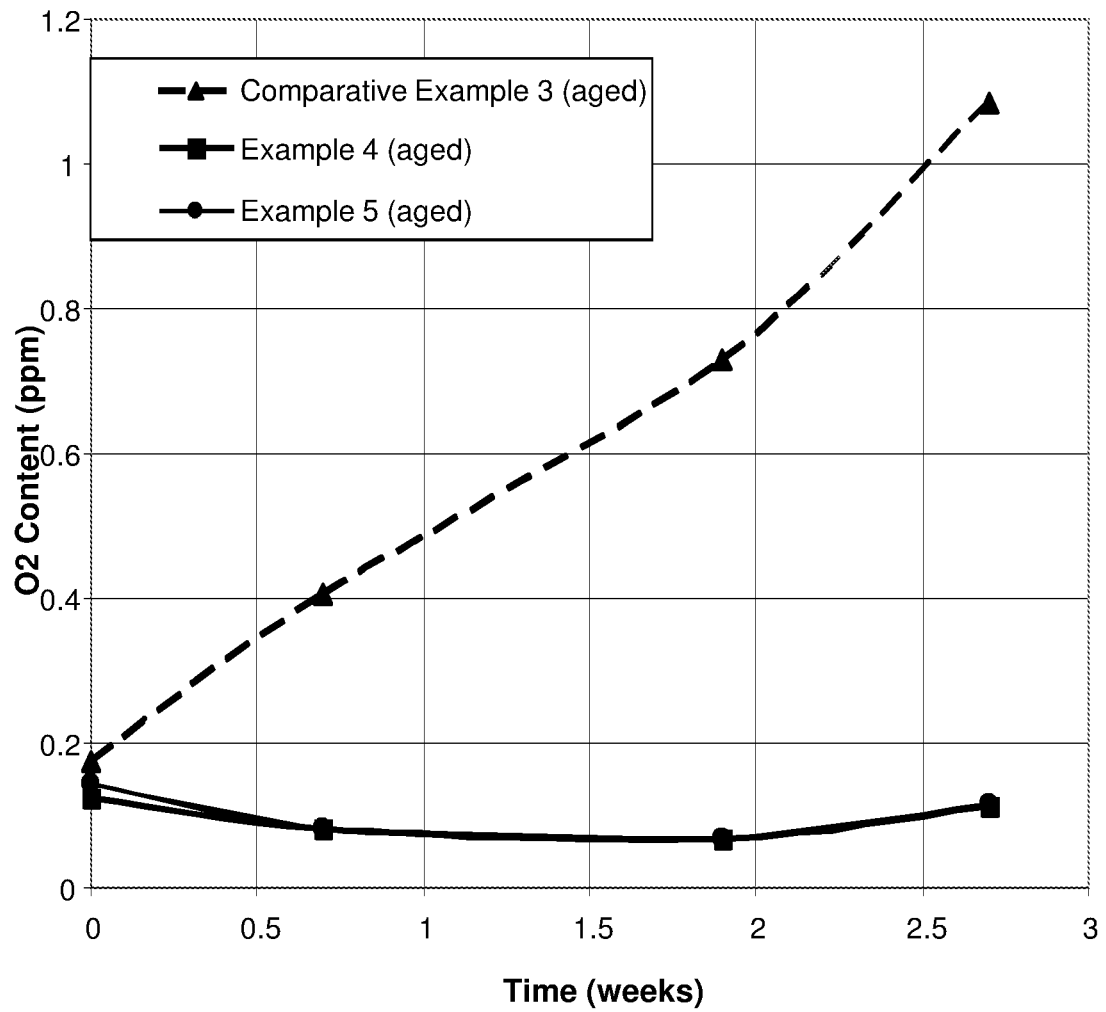
FIG. 5 is a graph depicting oxygen ingress data for aged PET bottles according to Comparative Example 3, Example 4, and Example 5.

The oxygen ingress data on the bottles made from the aged preforms is shown in FIG. 5. Even these bottles still showed an apparent induction period for oxygen scavenging and hence a high oxygen ingress of >1 ppm of oxygen in just under 3 weeks of storage time. The oxygen content/ingress continued to increase thereafter. Much longer aging was apparently needed in bottles of these compositions to overcome the induction period for scavenging. However, in reality, for the packaging of oxygen sensitive foods and beverages such a long induction period and a high initial oxygen ingress is not acceptable for the protection of color and taste qualities of the product.

Comparative Example 4

In Comparative Example 4, a PET bottle was made from the PET-3 resin with another oxidizable polyether-based additive, poly(tetramethylene ether) glycol (PTMEG) (Polymeg® 2000, Invista) (hereinafter referred to as "Polyether additive-B").

A blend of the PET-3 resin, 0.5 wt. % polyether additive-B, and 0.05 wt. % cobalt neodecanoate was fabricated into monolayer 20 oz. ketchup bottles (512 ml volume, average wall thickness=0.04 cm), using the 2 step injection stretch blow molding process described above. The oxygen ingress into these bottles was measured using the OxySense method also described above.

Figure 6:
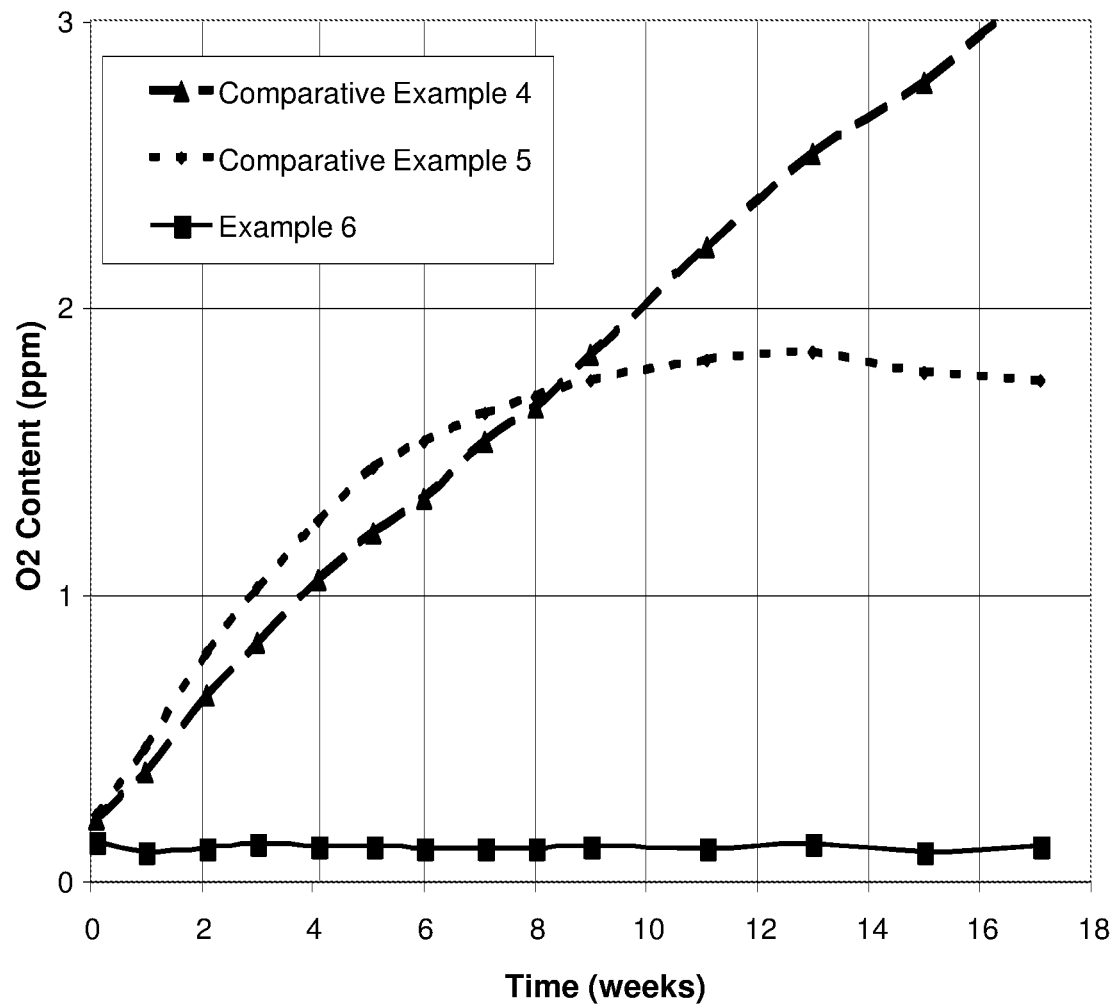
FIG. 6 is a graph depicting oxygen ingress data for PET bottles according to Comparative Example 4, Comparative Example 5, and Example 6.
Figure 7:
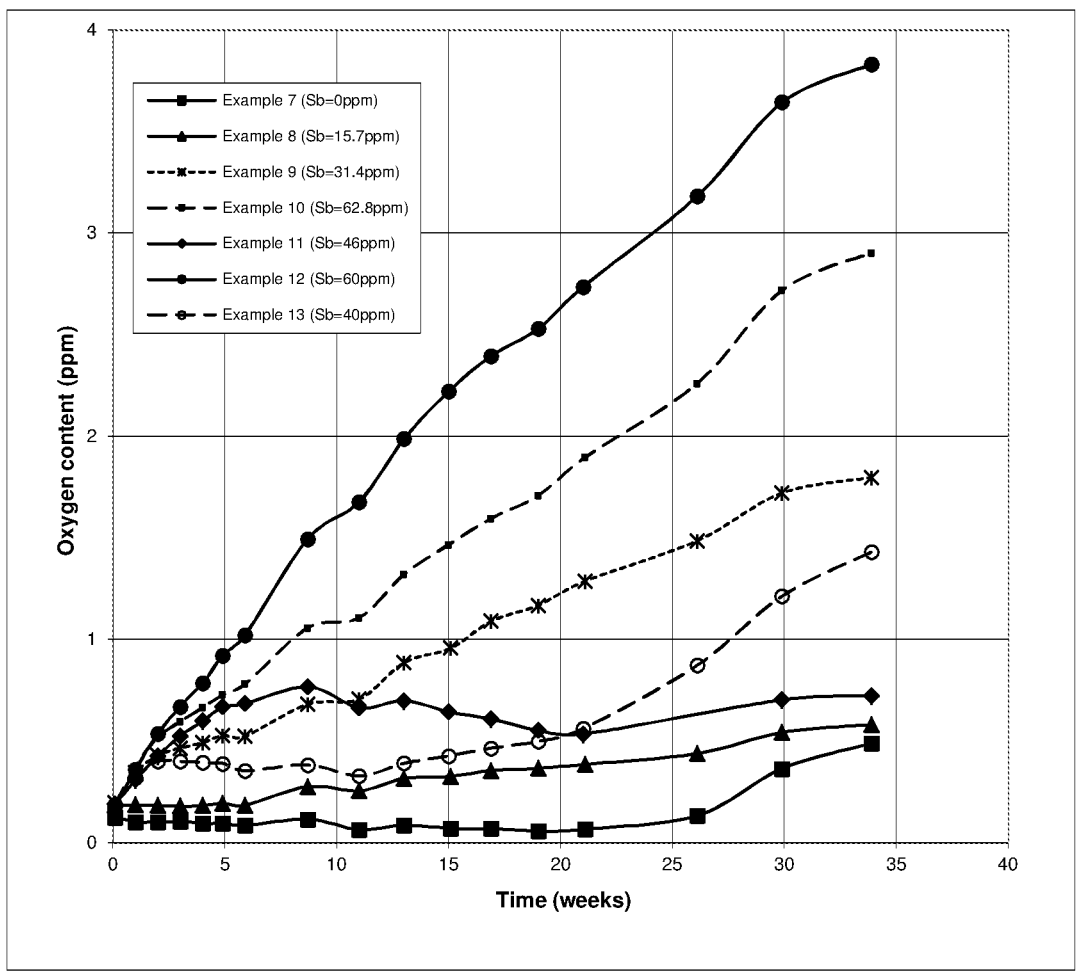
FIG. 7 is a graph depicting oxygen ingress data for PET bottles according to Example 7, Example 8, Example 9, Example 10, Example 11, Example 12, and Example 13.

The oxygen ingress data for this example is shown in FIG. 6. It may be noted that due to the presence of >300 ppm of antimony and >10 ppm of phosphorous as potential inhibiting impurities in the PET-3 resin, in spite of the presence of the polyether additive-B as the oxygen scavenger, the bottles exhibited an induction period for oxygen scavenging resulting in high oxygen ingress of >3 ppm of oxygen in 16 weeks which continued to increase thereafter, indicating the lack of oxygen scavenging.

Comparative Example 5

In Comparative Example 5, a PET bottle was made from the PET-1 resin mixed with the polyether additive-B.

A blend of 'PET-1' resin and 0.5 wt. % polyether additive-B and 0.05 wt. % cobalt neodecanoate (equivalent to 100 ppm Co) was fabricated into monolayer 20 oz. ketchup bottles (512 ml volume, average wall thickness=0.04 cm), using the 2 step injection stretch blow molded process described above. The measurement of oxygen ingress into these bottles was made using the OxySense method also described above.

The oxygen ingress data for this example is shown in FIG. 6. It may be noted that due to the presence of >200 ppm of antimony in the PET-1 resin, in spite of the presence of the oxidizable polyether additive-B, the bottle exhibited an induction period for oxygen scavenging and hence showed a high initial oxygen ingress of up to 1.8 ppm in the first 10 weeks of storage time. The oxygen content after this induction period seemed to level off somewhat, due to the slow onset of oxygen scavenging. However, for the packaging of oxygen sensitive food and beverage products such an induction period with high initial oxygen ingress is unacceptable.

Example 1

In Example 1, a PET bottle was made from the antimony-free PET-2 resin mixed with the polyether additive-A.

A blend of the PET-2 resin with 1 wt. % polyether additive-A and 0.035 wt. % of cobalt neodecanoate was fabricated into monolayer 20 oz. ketchup bottles (512 ml volume; average wall thickness=0.04 cm), using the 2-step injection stretch blow molding process described above. The bottles were tested for their oxygen scavenging performance using the OxySense method also described above.

The oxygen ingress data is shown in FIG. 2, in comparison with Comparative Example 1, which included the PET-3 resin having 350 ppm of antimony and the same polyether additive-A and cobalt neodecanoate. The bottles exhibited surprisingly no induction period for the onset of oxygen scavenging and showed negligible oxygen ingress from the start to over 6 months of storage time indicating excellent oxygen scavenging performance. The absence of antimony in the PET-2 resin used in this blend composition is believed to retain the catalytic activity of cobalt and the fast oxygen scavenging performance in these containers.

Example 2

In Example 2, a PET bottle was made from an antimony-free, aluminum catalyst-based PET resin (Laser+® 7000 (B92A) from DAK America) (hereinafter designated as "PET-5") and the polyether additive-A. This PET resin had an IV of 0.84 and no antimony.

A blend of the PET-5 resin with 1 wt. % polyether additive-A and 0.035 wt. % of Cobalt neodecanoate was used to make monolayer 20 oz. ketchup bottles (512 ml volume; average wall thickness=0.04 cm), using the 2-step injection stretch blow molding process described above. The bottles were tested for their oxygen scavenging performance using the OxySense method also described above.

The oxygen ingress data is shown in FIG. 2, in comparison with Comparative Example 1, which included the PET-3 resin having 350 ppm of antimony and the same polyether additive-A and cobalt neodecanoate. The bottles exhibited surprisingly no induction period for the onset of oxygen scavenging and showed negligible oxygen ingress from the start to over 6 months of storage time, indicating an excellent oxygen scavenging performance. The absence of antimony in the PET-5 resin used in this blend composition is believed to retain the catalytic activity of cobalt and the fast oxygen scavenging performance in these containers.

Example 3

In Example 3, a PET bottle was made from the antimony-free PET-2 resin mixed with the polyether additive-A.

A blend of PET-2 resin and 1.25 wt. % polyether additive-A and 0.035 wt. % of Cobalt neodecanoate was fabricated into monolayer 10 oz. juice bottles (306 ml volume; average wall thickness=0.04 cm), using the 2-step injection stretch blow molding process described above. The bottles were tested for their oxygen scavenging performance using the OxySense method also described above.

The oxygen ingress data shown in FIG. 3, in comparison with Comparative Example 2, which included the PET-4 resin having 227 ppm of antimony and the same polyether additive-A and cobalt neodecanoate. These bottles exhibited surprisingly no induction period for the onset of oxygen scavenging and showed near-zero oxygen ingress right from the start to over 6 months of storage time, indicating excellent oxygen scavenging performance. Such bottles are very useful from packaging oxygen-sensitive beverages such as orange juice.

Example 4

In Example 4, PET bottles were made from a blend of the antimony-free PET-2 resin and the polyether additive-A.

A blend of the PET-2 resin, 1 wt. % polyether additive-A, and 0.035 wt. % cobalt neodecanoate was first injection molded into monolayer 14 oz. ketchup bottle preforms (358 ml volume; average thickness=0.058 cm). A first bottle was formed from the freshly molded preform (no aging) and a second bottle was formed from a preform aged for two weeks at room temperature (23° C.) and 62% relative humidity for two weeks in order to compare the effects of preform aging on the bottle oxygen scavenging performance. The measurement of oxygen ingress into these bottles was done immediately after filling with deoxygenated water and sealing, using the OxySense method described earlier.

The oxygen ingress data made from freshly molded preforms is shown in FIG. 4. In contrast to Comparative Example 3 where an antimony-containing PET resin was used, these bottles showed high oxygen scavenging efficiency with no induction period, even as freshly molded without any pre-aging. In addition, they seemed to scavenge the initially present dissolved oxygen and continued to show near-zero oxygen ingress with time, indicating excellent oxygen scavenging rate.

The oxygen ingress data on the bottles made from the aged preforms is shown in FIG. 5. In contrast to Comparative Example 3, these bottles showed high oxygen scavenging efficiency without an induction period, confirming that no preform aging was necessary to activate the oxygen scavenging, because of the absence of antimony in the base PET-2 resin.

Example 5

In Example 5, PET bottles were made from another antimony-free, titanium-catalyst based PET resin (Laser+W Ti844, DAK America) (hereinafter referred to as "PET-6") mixed with the polyether additive-A. The PET-6 resin had an IV of 0.72 dl/g.

A blend of the PET-6 resin, 1 wt. % polyether additive-A, and 0.035 wt. % Cobalt neodecanoate was first injection molded into monolayer 14 oz. ketchup bottle preforms (358 ml volume; average wall thickness=0.058 cm). A first bottle was formed from the freshly molded preform (no aging) and a second bottle was formed from a preform aged for two weeks at room temperature (23° C.) and 62% relative humidity for two weeks in order to compare the effects of preform aging on the bottle oxygen scavenging performance. The measurement of oxygen ingress into these bottles was done immediately after filling with deoxygenated water and sealing, using the OxySense method described earlier.

The oxygen ingress data made from freshly molded preforms is shown in FIG. 4. In contrast to Comparative Example 3 where an antimony-containing PET resin was used, these bottles showed high oxygen scavenging efficiency without induction period, even as freshly molded, i.e., without any pre-aging. The oxygen ingress data on the bottles made from the aged preforms is shown in FIG. 5. In contrast to Comparative Example 3, these bottles showed high oxygen scavenging efficiency without an induction period, confirming that no preform ageing was necessary.

Example 6

In Example 6, a PET bottle was made from the PET-2 resin mixed with the polyether additive-B.

A blend of the PET-2 resin and 0.5 wt. % 'polyether additive-B' and 0.05 wt. % cobalt neodecanoate was fabricated into monolayer 20 oz. ketchup bottles (512 ml volume, average wall thickness=0.04 cm), using the 2-step injection stretch blow molding process described above. The bottles were tested for their oxygen scavenging performance using the OxySense method also described above.

The oxygen ingress data on these is shown in FIG. 6. In contrast to Comparative Examples 6 and 7, where antimony-containing PET resins was used, these bottles showed a surprisingly high oxygen scavenging efficiency with near zero oxygen ingress from the start to over 16 weeks without an induction period.

Examples 7-13

In Example 7, a blend of the 'non-antimony' PET-2 resin, 0.75 wt. % polyether additive-A, and 0.025 wt. % cobalt neodecanoate was first injection molded into a single cavity jar (i.e., container) preform mold, which was a 62 g, 43 mm threadless finish, 24 oz jar preform. The preform molding process was similar to that described in Example 1. The cycle time for the molding was about 45 sec. In a second step, these preforms were formed into jar-shaped containers by a reheat stretch-blow-trim process conducted on a Sidel SBO-1 machine set to run at a rate of about 800 jars per hour. In this process, the jar preforms were heated to a surface temperature of 102° C. prior to the blowing operation. The blow mold cavity temperature was set to about 125° C. The blow pressures were about 35 bar. Clear monolayer blow molded jar-type containers were thus obtained. Each of these jar-type containers actually consisted of two sections. The top portion is a dome or 'moil' above the molded 63 mm thread finish in the middle, while the bottom portion is the jar. In a subsequent step, these containers were trimmed by cutting between the moil and the top of the threads to produce the final 42 g, 63 mm threaded finish 24 oz jar. The separated moil was discarded or used as regrind material. The final blow-trimmed jars had a capacity of 650 mL and an average wall thickness of 0.063 cm.

In Examples 8-13, additional containers were fabricated using the same blow molding process described above for Example 7 and with the same amounts of polyether additive-A and colbalt neodecanoate, except that the PET-2 resin was blended with varying levels of antimony-based PET resins, as indicated in the table below. The resulting compositions had antimony levels ranging from 15.7 ppm to 62.8 ppm, as also indicated in the table below.

| Example | PET Resin | Antimony Level (ppm) |
|---|---|---|
| 7 | PET-2 | 0 |
| 8 | 95% PET-2 + 5% PET-7 | 15.7 |
| 9 | 90% PET-2 + 10% PET-7 | 31.4 |
| 10 | 80% PET-2 + 20% PET-7 | 62.8 |
| 11 | 80% PET-2 + 20% PET-4 | 46 |
| 12 | 80% PET-2 + 20% PET-8 | 60 |
| 13 | 80% PET-2 + 20% PET-9 | 40 |

PET-2: Laser+ HS Ti818, DAK America, 0 ppm antimony
PET-4: Laser+ D53A, DAK America, 227 ppm antimony
PET-7: NanYa AA52, Nan Ya Plastics Corp. America, 314 ppm antimony
PET-8: 8006, M&G Corp., 302 ppm antimony
PET-9: Polyclear 2201, Indorama/Auriga Polymers Inc., 201 ppm antimony
Polyether additive-A: poly(tetramethylene ether)-b-PET block copolymer (PTMEG-b-PET) (Oxyclear ® 3500, Indorama)

The oxygen ingress level in each jar was measured after filling with deoxygenated water using the OxySense method described above. As indicated by the oxygen ingress data in FIG. 7, good oxygen scavenging performance was achieved for Examples 8, 9, 11, and 13. Examples 8 and 11, having antimony levels of 0 and 46 ppm, respectively, showed oxygen scavenging performance very similar to Example 7, having an antimony level of 0 ppm. However, the data of Examples 10 and 12 indicates that oxygen levels will exceed 5 ppm before 18 months (i.e., 72 weeks). In other words, although low levels of antimony are acceptable in embodiments of the present invention, compositions having antimony concentrations greater than 46 ppm may not be suitable for some applications.

The foregoing examples and description of the preferred embodiments should be taken as illustrating, rather than as limiting the present invention as defined by the claims. As will be readily appreciated, numerous variations and combinations of the features set forth above can be utilized without departing from the present invention as set forth in the claims. Such variations are not regarded as a departure from the spirit and scope of the invention, and all such variations are intended to be included within the scope of the following claims.

The invention claimed is:

1. A bottle comprising a wall comprising at least one layer, said one layer comprising a composition, said composition comprising:
   polyethylene terephthalate that is substantially free of antimony and substantially free of phosphorous;
   an oxidizable polyether-based additive; and
   a transition metal catalyst, wherein the transition metal catalyst comprises cobalt, wherein the wall has an oxygen permeability of not more than about 3.0 $cm^3$ $mm/(m^2$ atm day) immediately after the package is formed.

2. The bottle of claim 1, wherein the polyethylene terephthalate contains less than 100 ppm of antimony.

3. The bottle of claim 1, wherein the polyethylene terephthalate contains less than 50 ppm of antimony.

4. The bottle of claim 1, wherein the polyethylene terephthalate contains less than 10 ppm of antimony.

5. The bottle of claim 4, wherein the polyethylene terephthalate contains between about 0 ppm and about 2 ppm of antimony.

6. The bottle of claim 1, wherein the oxidizable polyether-based additive has the formula X—[R—O]$_n$—R'—Y, wherein
   R is a substituted or unsubstituted alkylene chain having from 2 to 10 carbon atoms;
   n ranges from 4 to 100;
   X and Y are selected from the group consisting of H, OH, OCOR$_1$, OCOAr$_1$, —OR$_1$, and —OAr$_1$, wherein R$_1$ is an alkyl group having from 2 to 18 carbon atoms and Ar$_1$ is an aryl group; and
   R' may be the same as R or selected from the group consisting of —[COR$_2$COOR$_3$O]$_p$— and —[COAr$_2$COOR$_3$O]$_p$— wherein Ar$_2$ is a phenylene or naphthylene group, R$_2$ and R$_3$ are C$_2$ to C$_{18}$ alkylene groups, and p ranges from 10 to 100.

7. The bottle of claim 1, wherein the oxidizable polyether-based additive is selected from the group consisting of polyether diols, ester capped derivatives of polyether diols, polyether-polyester block copolymers, and ether end-capped derivatives of polyether diols.

8. The bottle of claim 1, wherein the oxidizable polyether-based additive comprises polytetramethylene ether glycol.

9. The bottle of claim 8, wherein the oxidizable polyether-based additive comprises PTMEG-b-PET copolymer.

10. The bottle of claim 8, wherein the oxidizable polyether-based additive comprises polytetramethylene ether glycol dimethyl ether.

11. The bottle of claim 1, wherein package is a monolayer package and the composition comprises up to about 1 wt. % of the oxidizable polyether-based additive.

12. The bottle of claim 11, wherein the composition comprises up to about 0.5 wt. % of the oxidizable polyether-based additive.

13. The bottle of claim 1, wherein package is a multilayer package, wherein the composition comprises a single layer, and wherein the composition comprises at least 0.5 wt. % of the oxidizable polyether-based additive.

14. The bottle of claim 13, wherein the composition comprises about 1 wt. % to about 5 wt. % of the oxidizable polyether-based additive.

15. The bottle of claim 1, wherein the transition metal catalyst comprises a carboxylate salt of cobalt.

16. The bottle of claim 15, wherein the transition metal catalyst comprises cobalt neodecanoate.

17. The bottle of claim 1, wherein the polyethylene terephthalate contains less than about 10 ppm of phosphorous.

18. The bottle of claim 17, wherein the polyethylene terephthalate contains less than about 5 ppm of phosphorous.

19. The bottle of claim 1 wherein the wall is a monolayer wall.

20. The bottle of claim 1 wherein the wall has an oxygen permeability of not more than about 1.7 $cm^3$ $mm/(m^2$ atm day).

21. A bottle comprising a wall comprising at least one layer, said one layer comprising a composition, said composition comprising:
    polyethylene terephthalate that is substantially free of antimony;
    an oxidizable polyether-based additive; and
    a transition metal catalyst, wherein the transition metal catalyst comprises cobalt, wherein the wall has an oxygen permeability of not more than about 3.0 $cm^3$ $mm/(m^2$ atm day) immediately after the package is formed.

22. The bottle of claim 21, wherein the polyethylene terephthalate contains less than 100 ppm of antimony.

23. The bottle of claim 22, wherein the polyethylene terephthalate contains less than 50 ppm of antimony.

24. The bottle of claim 23, wherein the polyethylene terephthalate contains less than 10 ppm of antimony.

25. The bottle of claim 24, wherein the polyethylene terephthalate contains between about 0 ppm and about 2 ppm of antimony.

26. The bottle of claim 21, wherein the oxidizable polyether-based additive has the formula X—[R—O]$_n$—R'—Y, wherein
    R is a substituted or unsubstituted alkylene chain having from 2 to 10 carbon atoms;
    n ranges from 4 to 100;
    X and Y are selected from the group consisting of H, OH, —OCOR$_1$, —OCOAr$_1$, —OR$_1$, and —OAr$_1$, wherein R$_1$ is an alkyl group having from 2 to 18 carbon atoms and Ar$_1$ is an aryl group; and
    R' may be the same as R or selected from the group consisting of —[COR$_2$COOR$_3$O]$_p$— and —[COAr$_2$COOR$_3$O]$_p$— wherein Ar$_2$ is a phenylene or naphthylene group, R$_2$ and R$_3$ are C$_2$ to C$_{18}$ alkylene groups, and p ranges from 10 to 100.

27. The bottle of claim 21, wherein the oxidizable polyether-based additive is selected from the group consisting of polyether diols, ester capped derivatives of polyether diols, polyether-polyester block copolymers, and ether end-capped derivatives of polyether diols.

28. The bottle of claim 21, wherein the oxidizable polyether-based additive comprises polytetramethylene ether glycol.

29. The bottle of claim 28, wherein the oxidizable polyether-based additive comprises PTMEG-b-PET copolymer.

30. The bottle of claim 28, wherein the oxidizable polyether-based additive comprises polytetramethylene ether glycol dimethyl ether.

31. The bottle of claim 21, wherein package is a monolayer package and the composition comprises up to about 1 wt. % of the oxidizable polyether-based additive.

32. The bottle of claim 21 wherein the wall is a monolayer wall.

33. The bottle of claim 20 wherein the wall has an oxygen permeability of not more than about 0.7 cm$^3$ mm/(m$^2$ atm day).

34. The bottle of claim 33 wherein the wall has an oxygen permeability of not more than about 0.2 cm$^3$ mm/(m$^2$ atm day).

35. The bottle of claim 34 wherein the wall has an oxygen permeability of not more than about 0.03 cm$^3$ mm/(m$^2$ atm day).

36. The bottle of claim 21 wherein the wall has an oxygen permeability of not more than about 1.7 cm$^3$ mm/(m$^2$ atm day).

37. The bottle of claim 36 wherein the wall has an oxygen permeability of not more than about 0.7 cm$^3$ mm/(m$^2$ atm day).

38. The bottle of claim 37 wherein the wall has an oxygen permeability of not more than about 0.2 cm$^3$ mm/(m$^2$ atm day).

39. The bottle of claim 38 wherein the wall has an oxygen permeability of not more than about 0.03 cm$^3$ mm/(m$^2$ atm day).

* * * * *